3,252,796
VISICULAR-TYPE PHOTOGRAPHIC PROCESS AND
THE PREPARATION OF MATERIALS FOR SUCH
Robert M. Lindquist and Edward E. Ryskiewicz, Los
Altos, Calif., assignors to International Business Machines Corporation, New York, N.Y., a corporation of New York
No Drawing. Filed Dec. 7, 1961, Ser. No. 157,811
4 Claims. (Cl. 96—49)

Our invention relates to photographic processes utilizing refraction image films, and more particularly, to processes for reducing the time required to develop this type film.

Refractive images are formed in such film by the formation of large numbers of small bubbles in areas which have been exposed to light. In the usual type photography, light is absorbed by metal particles, such as silver, while in refractive image type films, light is reflected from the small bubbles present in the film.

Those skilled in the art have, for many years, believed that bubble formation in refractive films could be enhanced by the presence of crystals in the film matrix. However, these additives have not appreciably improved the rate of bubble formation. It has also been known for several years that the development speed of a refractive film could be increased temporarily by pulling the film over a knife edge at a sharp angle. The rate of bubble formation, however, was not uniformly increased throughout the film, and the effect was temporary. As a result of these two deficiencies, the effect remained a laboratory curiosity.

Similarly, the exposure of refractive films to thermal cycling in water also increases the speed of the film. Oftentimes, this thermal cycling causes the formation of a haze which reduces the value of the film for some uses.

We have now discovered a photographic process wherein gases are used to permanently increase the rate of bubble formation in refractive films, and that this result is accomplished without appreciable hazing of the film.

Our invention comprises forming, in a refractive image film, essentially invisible cavities by means of a gas, exposing the cavitated film to image defining radiation to release a bubble forming material, and heating the film to form visible bubbles in the exposed area.

Bubbles which are invisible, or essentially invisible, are formed in the first step of our process. These microcavities are usually formed by several means, a number of which are set out in the following paragraphs:

(1) a refractive film is made up containing two photosensitive substances which are sensitive to electromagnetic radiation of different wavelengths, for example, p-dimethylamino benzene diazonium chloride zinc salt, which decomposes on exposure to light of essentially 3850 A. wavelength, and 7-dimethylamino-3-oxo-dihydrobenzo-1,4, thiazine-6-diazonium chloride zinc salt, which can be decomposed at essentially 4750 A. wavelength. A preferred film contains a diazo compound which decomposes on exposure to visible light and a diazo compound which decomposes on exposure to ultraviolet light. The film is exposed to visible light to decompose one of the diazo compounds and heated to expand the released nitrogen to form invisible bubbles.

(2) A film is prepared containing a material which decomposes when exposed to heat alone to release a gas and a photosensitive material which is not heat decomposable at temperatures at which the heat thermosensitive material decomposes.

Such a film can contain N,N'-diethyl-N,N'-dinitrosoterephthalamide which decomposes in a vinyl chloride film at about 125° C. and dimethylaminobenzene diazonium chloride zinc salt.

(3) A thermoplastic film containing a photodecomposable compound can be supersaturated with an inert gas at temperatures below the second order transition temperature (heat deformation temperature) of the film and heated to a temperature below the second order transition temperature of the plastic and below the decomposition temperature of the photosensitive material to blow invisible bubbles in the refractive image forming film.

(4) A film can be prepared containing two heat decomposable substances, one of which is readily decomposed at a low temperature and the other which is decomposed at a higher temperature. The film is utilized by uniformly decomposing the low temperature gas former, heating the film to blow invisible bubbles, exposing the film to image defining heat of a higher temperature to decompose the second material, thereby forming a latent image, and finally heating the film to form visible bubbles.

(5) In still another process, the usual commercial film containing only one diazo compound is uniformly exposed to a flash of UV light insufficient to decompose more than a small fraction of the total photodecomposable material, heated to form invisible bubbles, exposed to the image defining UV light, and reheated to form visible bubbles corresponding to the defined image.

In all of the above processes, the gas which forms the invisible bubbles can be allowed to diffuse from the refractive image forming film prior to exposing and heating the film to form gas from which the visible bubbles are derived.

Generally speaking, the diameter of the invisible bubbles must be at least on the order expressed by the relationship $$\frac{4\gamma}{P}$$

where $\gamma$, gamma, is the surface tension of the polymeric matrix in dynes per centimeter and P is the pressure in dynes per $cm.^2$ of the bubble forming gas. The bubbles forming these microcavities should be no larger than about $0.5\mu$ in diameter as the bubbles become visible when the diameter is in excess of $0.5\mu$.

The minimum diameter required to form a permanent bubble varies with the polymer, the amount of plasticizer in the polymer matrix, the temperature, the gas pressure, the diffusion rate of the gas through the polymer, and other factors.

The required exposure time, heat development temperatures, etc. vary with the polymer mixtures, the blowing gas, the plasticizer in the polymer and the amount of plasticizer in the polymer, etc. To formulate a set of operable conditions for each of the photo or heat decomposable materials and polymers would be impossible. A certain skill on the part of those skilled in the art is required to formulate a set of specific conditions for the development of appropriate cavities in the polymer matrices. The necessary conditions for each photographic system can readily be determined by a series of routine experiments requiring only pedestrian skill.

Our invention is further illustrated by the following specific examples:

*Example I*

A commercial refractive image type film, made of copolymers of vinyl chloride and acrylonitrile and sensitized by p-dimethylamino benzene diazonium chloride zinc salt, was exposed to light from a GE 250 w. UV arc II Lamp for 30 seconds and afterwards heated to 185° F. for 15 seconds in a glycerol bath. The material was allowed to sit for 6 days and exposed to 80 mw./sec./$cm.^2$ light having a wavelength of $430\mu$.

The material was then heated in glycerol for 15 seconds at 240° F. to develop an image having a specular density of 0.6. The light to which the film was exposed had a wave length of 430μ. It was necessary to expose a commercial film which had been thermally cycled to the same wavelength light for 103 mw./sec./cm.² to obtain the same specular density. The thermally cycled film is about three times faster than uncycled films at a specular density of 0.6.

*Example II*

A photographic film is prepared from a mixture of polymers by dissolving 400 mg. of 6-diazo-7-dimethylamino-3-oxo-dihydro-1,4-thiazine borofluoride, and 200 mg. of trichloroacetic acid, and 400 mg. of p-dimethylamino benzene diazonium chloride zinc salt in acetonitrile, mixing the solutions into a solution of Saran F-200 (a copolymer of vinyl chloride and acrylonitrile) and Acryloid A-101 (polymethylmethacrylate) in 2-butanone. The final polymer solution comprises 3% Saran and 5% Acryloid by weight in the 2-butanone. Additional 2-butanone is added and the solution coated on sheets of a polyethyleneterephthlate polyester film with a doctor blade. The film is exposed to light of about 4750 A. wavelength and heated to about 200° F. to form invisible bubbles in the film. The film is then exposed to an image defining light of a wavelength of about 3850 A. and heated to about 240° F. to provide a final image.

*Example III*

A 3 mil. thick sheet of Saran containing p-dimethylamino benzene diazonium chloride zinc salt is placed in a bomb and pressurized for 5 hours at 1700 p.s.i. and 70-80° C. with nitrogen. The bomb is cooled and vented. The film is removed and heated to form a film having a slight haze. The film is then exposed to UV light and heated to form an image in the exposed areas of the film.

Now, having described our invention, we claim:

1. In the process of forming images in a refractive image defining film, containing a first diazonium compound capable of decomposing upon exposure to light to form nitrogen gas, and prior to the decomposition of said diazonium compound for forming the refractive image, the steps comprising:
   uniformly distributing a gas, throughout said film, from a source selected from the group consisting of a second diazonium compound in said film decomposable by exposure to light of a wavelength different from the wavelength of light for decomposing said first diazonium compound, and an external gas, inert with respect to the film, diffusable into said film by the application of pressure; and
   heating the film to a temperature below its second order transition temperature to expand the gas and blow, in the film, cavities having a diameter not greater than 0.5 micron so as to be substantially invisible.

2. In the process of forming images in a refractive image defining film, containing a diazonium compound capable of decomposing upon exposure to light to form nitrogen gas, and prior to the decomposition of said diazonium compound for forming the refractive image, the steps comprising:
   supersaturating said refractive defining film with external nitrogen gas by the application of pressure; and
   heating the supersaturated film to a temperature below its second order transition temperature to expand the gas and blow, in the film, cavities having a diameter not greater than 0.5 micron so as to be substantially invisible.

3. In the process of forming images in a refractive image defining film, containing a diazonium compound capable of decomposing to form nitrogen gas, and prior to the decomposition of said compound for forming the refractive image, the steps comprising:
   supersaturating said refractive image defining film with an external gas by the application of pressure, said gas being inert with respect to the film; and
   heating the supersaturated film to a temperature below its second order transition temperature to expand the gas and blow, in the film, cavities having a diameter not greater than 0.5 micron so as to be substantially invisible.

4. The process comprising uniformly exposing a refractive image forming film containing two photodecomposable nitrogen forming diazonium compounds, one of which is substantially insensitive to the wavelength light to which the other is sensitive, to light of a wavelength which will decompose one, but not the other of the photodecomposable diazonium compounds, heating the film to uniformly form substantially invisible cavities throughout the length and breadth of the film, exposing the film to an image defining light of a wavelength which will decompose the other photodecomposable diazonium compound, and heating the film to form visible cavities in the portions of the film exposed to image defining light.

References Cited by the Examiner

UNITED STATES PATENTS

| | | | |
|---|---|---|---|
| 2,911,299 | 11/1959 | Baril et al. | 96—49 |
| 2,950,194 | 8/1960 | Glavin | 96—49 X |
| 3,032,414 | 5/1962 | James | 96—75 X |
| 3,108,872 | 10/1963 | McMahon | 96—49 X |

FOREIGN PATENTS 645,825  11/1950  Great Britain.

OTHER REFERENCES

"Hypersensitizing," The Focal Encyclopedia of Photography, vol. 1, The Focal Press for the Caxton Publishing Company, Limited, New York, p. 570 (1958).

Lindquist: IBM Technical Disclosure Bulletin, vol. 3, No. 2, July 1960, p. 3.

J. TRAVIS BROWN, *Acting Primary Examiner.*

HAROLD N. BURSTEIN, NORMAN G. TORCHIN, *Examiners.*

R. L. STONE, A. D. RICCI, *Assistant Examiners.*